Figure 1:
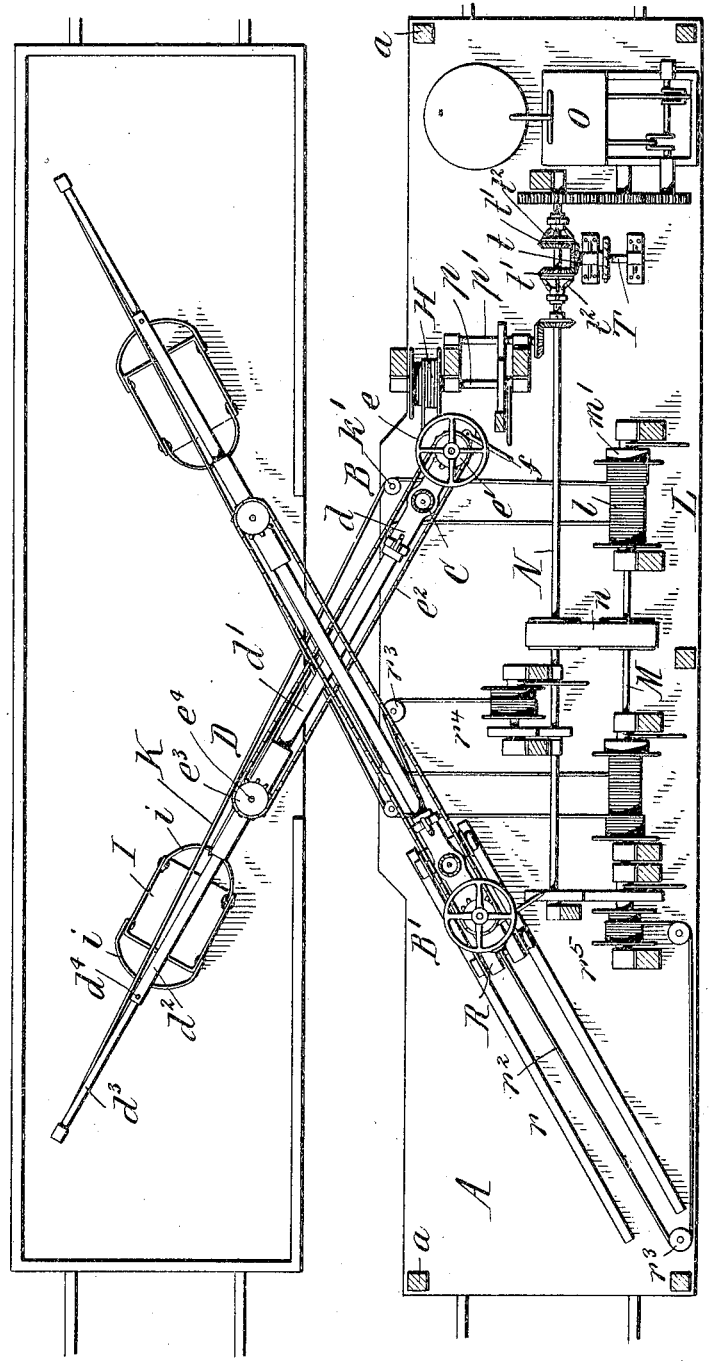

No. 769,923. PATENTED SEPT. 13, 1904.
J. P. SHEEHAN & C. O. JOHNSON.
CAR UNLOADING DEVICE.
APPLICATION FILED APR. 9, 1904.
NO MODEL. 3 SHEETS—SHEET 1.

Witnesses:
E. A. Volk.
R. W. Rumser

Inventors
John P. Sheehan.
Charles O. Johnson,
by Wilhelm, Parker & Hard.
Attorneys.

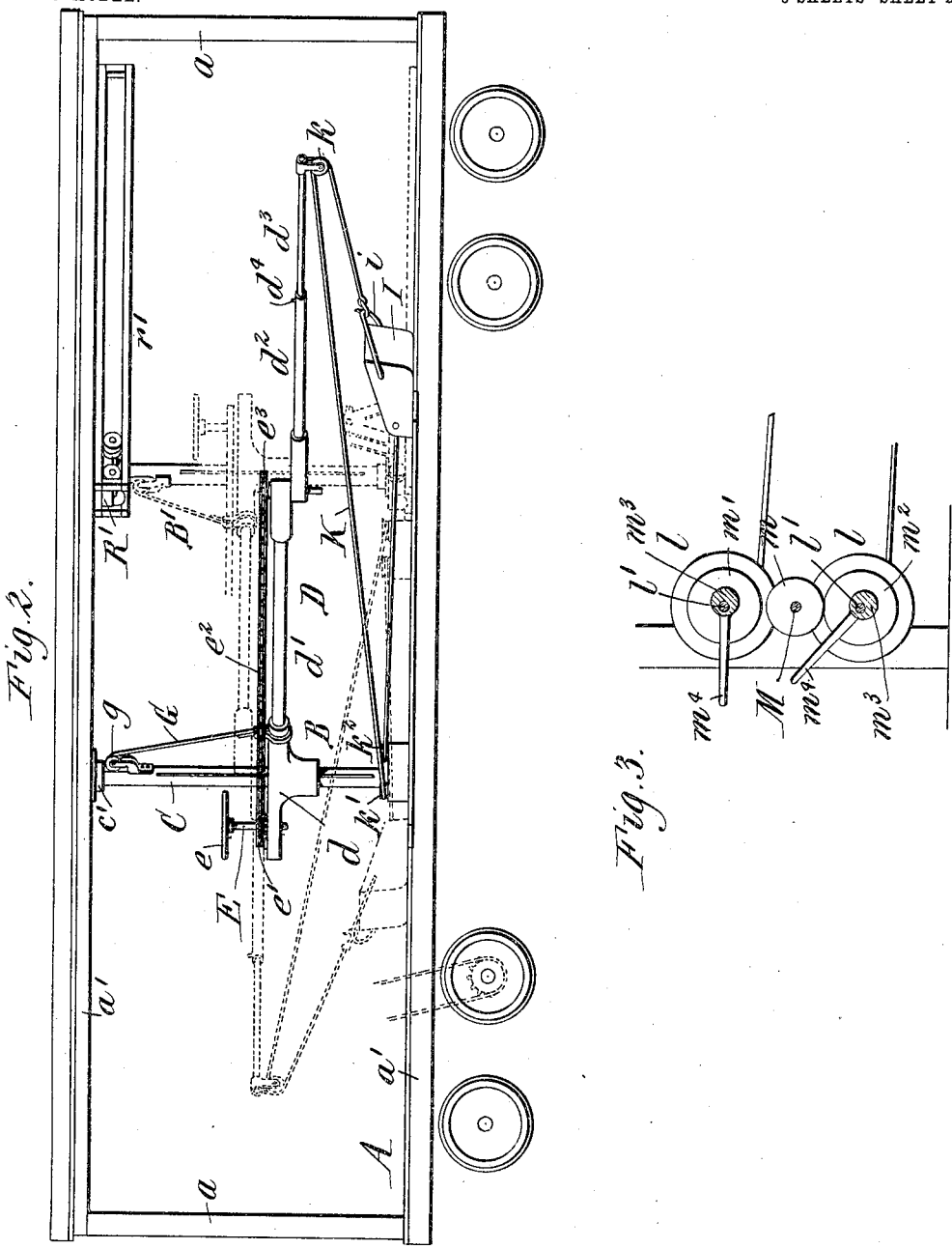

No. 769,923. PATENTED SEPT. 13, 1904.
J. P. SHEEHAN & C. O. JOHNSON.
CAR UNLOADING DEVICE.
APPLICATION FILED APR. 9, 1904.
NO MODEL. 3 SHEETS—SHEET 3.
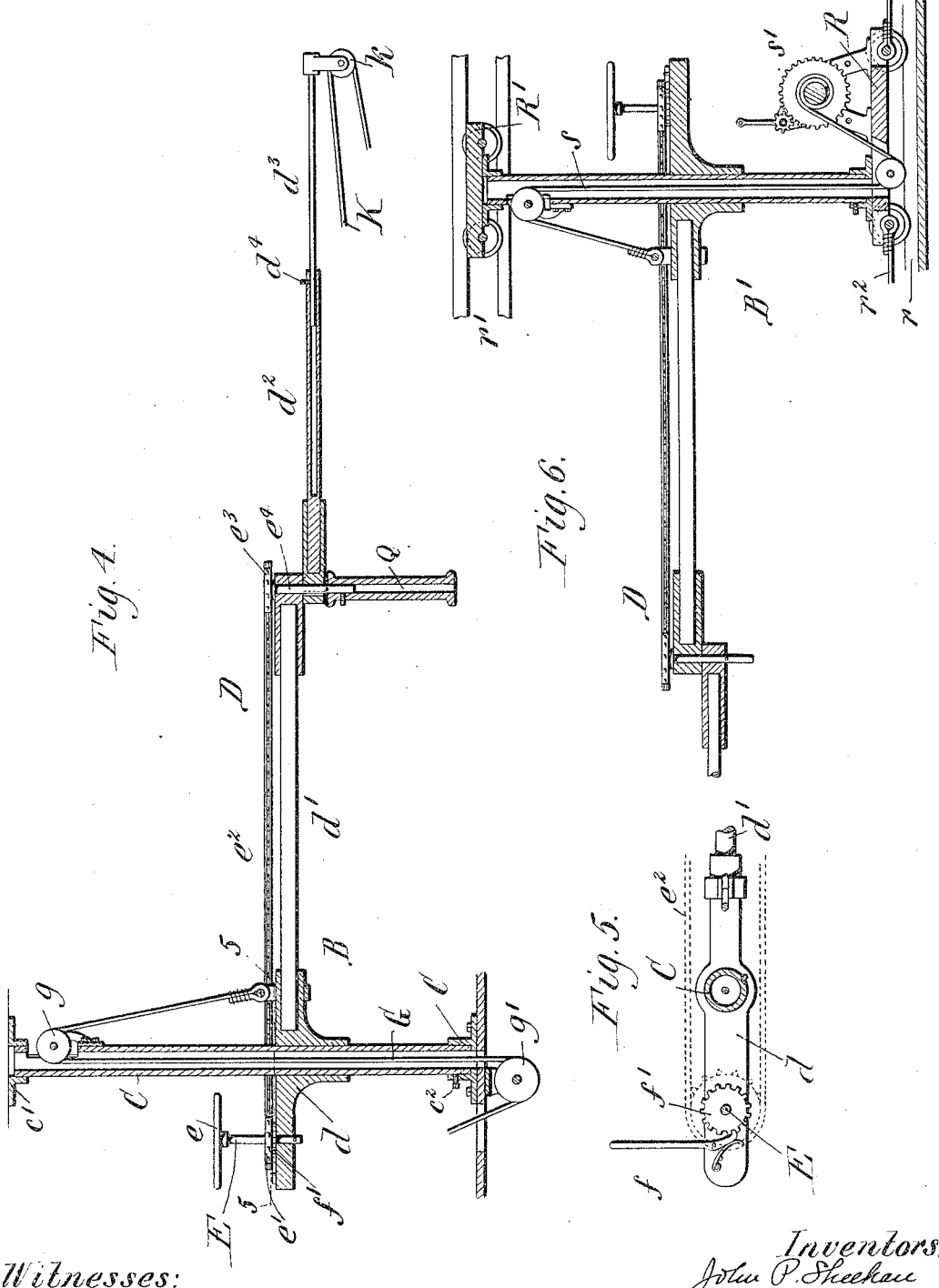
Witnesses:
E. A. Volk
R. W. Rumser
Inventors
John P. Sheehan
Charles O. Johnson
by Wilhelm, Parker & Hard.
Attorneys.

No. 769,923.	Patented September 13, 1904.

UNITED STATES PATENT OFFICE.

JOHN P. SHEEHAN AND CHARLES O. JOHNSON, OF BUFFALO, NEW YORK.

CAR-UNLOADING DEVICE.

SPECIFICATION forming part of Letters Patent No. 769,923, dated September 13, 1904.

Application filed April 9, 1904. Serial No. 202,354. (No model.)

*To all whom it may concern:*

Be it known that we, JOHN P. SHEEHAN and CHARLES O. JOHNSON, citizens of the United States, residing at Buffalo, in the county of Erie and State of New York, have invented new and useful Improvements in Car-Unloading Devices, of which the following is a specification.

This invention relates to portable car-unloading devices having power-operated traveling scoops or shovels adapted to be operated in a railway-car to shovel or move loose, lumpy, granular, and the like material from different parts of the car to and out of the car-door or to a desired point where it can be more readily handled or discharged.

The objects of the invention are to provide a device for this purpose which can be quickly and easily moved alongside of a car and adjusted and operated to move or remove the load from all parts of the car; to make a device of desirable, strong, and economical construction; to so construct the device that it can be operated without being attached to or supported by the car being unloaded, and to produce a device which reduces to the minimum the labor of the operator.

In the accompanying drawings, consisting of three sheets, Figure 1 is a plan view, partly in section, of a car and an unloading device embodying the invention in operative relation to said car. Fig. 2 is a fragmentary side elevation thereof. Fig. 3 is an elevation, partly in section, on an enlarged scale, of one of the scoop-operating windlasses. Fig. 4 is a sectional elevation, on an enlarged scale, of the stationary crane. Fig. 5 is a horizontal section, partly in plan, on an enlarged scale, in line 5 5, Fig. 4. Fig. 6 is a fragmentary sectional elevation, on an enlarged scale, of the traveling crane.

Like letters of reference refer to like parts in the several figures.

The unloading device comprises a movable car or support which is adapted to be run up alongside of the car to be unloaded on the adjoining track, one or more cranes, derricks, or analogous devices each having a boom or gib, a scoop or shovel connected to an operating-cable or other flexible carrier supported by the boom, which is adjustable to properly direct the movements of the scoop or shovel in the various portions of the car being unloaded, and windlasses or the like for operating the scoop-carrier and for raising and lowering the boom, and power-operated mechanism for operating said windlasses and which is also preferably geared to the wheels of the car or support for propelling the latter.

A represents the car or movable support of the unloading device, the same being preferably in the form of a flat-car having wheels for running on the usual railroad-track. The car preferably has an open frame consisting of uprights $a$ and horizontal beams or members $a'$.

The car is preferably provided with two cranes, derricks, or the like for supporting and directing the movements of the traveling scoops, one of which cranes or derricks, B, is stationarily mounted on the flat-car, while the other, B', is mounted on a traveling carriage to be moved on the car to the most favorable position for operation or to be moved out of the way of the stationary crane when this alone is used. Either a single stationary or traveling crane or derrick or two or more stationary or traveling cranes or derricks can be employed, as found most desirable.

The upright mast or column C of the stationary crane or derrick (see Figs. 2 and 4) is pivotally mounted in a bearing $c$ on the flat-car and is preferably steadied by a bearing $c'$ for its upper end secured to one of the horizontal frame members of the car. It is adapted to be turned in its bearings and is held stationary when adjusted by any suitable means, a set-screw $c^2$ being shown for this purpose.

D is a boom or arm provided at its inner end with a hub or portion $d$, through which the mast extends and to which it is splined, as shown in Fig. 5, or otherwise connected to permit the boom to be adjusted vertically on the mast and hold it from swinging thereon. The boom consists of an inner section $d'$, an outer hollow section $d^2$, which is hinged to the outer end of the inner section to swing horizontally, and an extension $d^3$, which telescopes into the hollow swinging section, in which it is secured in adjusted positions by a set-screw or the like $d^4$. The swinging section of the boom is swung horizontally by a shaft E, journaled on the inner end of the boom and provided with a suitable hand-wheel or device $e$ for turning the same, and a sprocket-wheel $e'$, connected by a sprocket-chain $e^2$ to a sprocket-wheel $e^3$ on the vertical hinge-pin $e^4$ for the hinged section, which is fixed to the latter and is journaled in a bearing-hole in the inner section of the boom. By turning the hand-wheel the hinged outer section of the boom can be swung around to any desired angle to the inner section, and it is held in adjusted positions by the engagement of a dog $f$, Fig. 5, with a toothed wheel $f'$, secured to the operating-shaft E. Other known means can be used for swinging and holding the swinging section.

The boom is raised and lowered on the mast by a rope or cable G, secured at one end to the boom and passing around sheaves or pulleys $g$ $g'$ at the upper and lower ends, respectively, of the mast and connected at the other end to a suitable windlass H, which is preferably power-operated, as hereinafter described.

I represents a scoop, shovel, or drag for moving or shoveling the load. It is attached by bails or chains $i$ at its opposite ends to a carrier, belt, or cable K, one end of which passes around a supporting-sheave $k$, mounted on the end of the boom extension, thence over a guide sheave or pulley $k'$ on the flat-car and is connected to a suitable windlass L, while the other end of the belt or cable passes over a guide sheave or pulley $k^2$ on the flat-car and is also connected to the windlass L. The latter may be of any usual or preferred form adapted to wind up and pay off opposite ends of the belt or cable to draw the shovel or scoop back and forth toward and from the end of the boom. The windlass shown (see Figs. 1 and 3) consists of two drums $l$, mounted on separate shafts $l'$ on opposite sides of a counter-shaft M, having a friction or other gear-wheel $m$, adapted to drive corresponding wheels $m'$ $m^2$ on the drum-shafts $l'$, respectively. The drum-shafts are journaled eccentrically in rotatable bearing-blocks $m^3$, provided with levers $m^4$ for turning them. By properly operating the levers either drum-shaft can be moved toward and geared to the counter-shaft while the other is moved out of gear therewith. Each end of the scoop-operating belt or cable is connected to one of the windlass-drums and is wound upon its drum when the latter is positively driven. By alternately driving the drums the belt or cable and the scoop attached thereto are moved in different directions In the construction shown the counter-shaft is connected by a belt $n$ to a main drive-shaft N, journaled in suitable bearings on the flat-car and driven by a steam-engine or other motor O, geared thereto. Any other suitable mechanism may be employed for moving the scoop or shovel in opposite directions.

The windlass H for raising and lowering the boom on the mast (see Fig. 1) consists of a drum which is operated similarly to the drums of the scoop-operating windlass by moving its shaft $p$ into and out of gear with a counter-shaft $p'$, geared to the main drive-shaft. The drum is driven to raise the boom and is released, so as to allow the boom to descend by its own weight.

To unload a car, the car or support of the unloading device is run up alongside thereof on an adjoining track and the boom of the crane or derrick raised to the proper height and projected into the door of the car in the case of a box-car or over the side of a gondola car, and the swinging outer section and telescoping extension of the boom are adjusted to direct the scoop or shovel to any desired portion of the car from which the load is shoveled to the door or side of the car. In unloading a car on a trestle the load can be moved directly out of the door and permitted to fall through the trestle into suitable bins or receptacles below the trestle. The boom is shifted from place to place in the car and raised or lowered, as necessary, to remove all portions of the load. It can be quickly and easily adjusted to enable the scoop to operate in remote corners or portions of the car, and very little labor is necessary to completely empty the car. The boom is wholly supported from the flat-car and does not need to be attached to or supported by the car being unloaded.

The elbow of the boom can be provided, if necessary, with a guide sheave or sleeve Q, Fig. 4, to hold the shovel belt or cable out of contact with the sides of the car-door when the hinged section of the boom is bent at an angle to operate upon the load at the rear side of the car. The traveling crane is similar to the stationary one already described except that it is supported by lower and upper wheeled carriages R R', running on suitable lower and elevated tracks $r$ $r'$ on the flat-car and its frame. The traveling crane is moved on its tracks by a belt, cable, or the like $r^2$, secured to the crane and passing around suitably-placed guide-sheaves $r^3$ to windlasses $r^4 r^5$, similar to that employed for raising and lowering the boom of the stationary crane, and driven by the main and counter shafts N and M. The boom of the traveling crane, like that of the stationary crane, consists of the hinged and telescoping parts and is raised and lowered in the same manner as the other by a cable $s$, connected to a suitable hand-operated windlass $s'$ on the lower carriage of the crane. It will be understood that the two cranes can be used separately or simultaneously, as most advantageous. When the traveling crane is not in use, it can be run back out of the way on its tracks.

Drive mechanism is preferably employed connecting the engine or motor with the wheels of the flat-car, so that the latter is self-propelling and can be moved about as required independently of a locomotive. This is accomplished in the construction shown by a shaft T, Fig. 1, suitably journaled on the flat-car and belted or otherwise geared to one of the axles of the flat-car, as shown by broken lines in Fig. 2, and having a bevel-gear $t$, which meshes with two bevel gear-wheels $t'$, loose on the main drive-shaft. Each gear-wheel $t'$ has a clutch $t^2$ for coupling it to the drive-shaft. By coupling one wheel to the main drive-shaft the shaft T is driven in a direction to propel the car in one direction, while by coupling the other wheel to the drive-shaft the car is moved in the opposite direction.

We claim as our invention—

1. In an unloading device, the combination of a wheeled support, a crane thereon provided with a boom having a horizontally-swinging section, means for adjusting said swinging section angularly, a scoop or the like, an operating-cable for said scoop supported by the outer end of said boom, and means for operating said cable, substantially as set forth.

2. In an unloading device, the combination of a wheeled support, a crane thereon provided with a boom having a horizontally-swinging section provided with an adjustable extension means for adjusting said swinging section angularly, a scoop or the like, an operating-cable for said scoop supported by said extension of the boom, and a windlass for operating said cable, substantially as set forth.

3. In an unloading device, the combination of a wheeled support, a crane thereon having a pivoted mast, and a boom vertically adjustable on said mast and provided with a horizontally-swinging section, means for adjusting said boom vertically and said swinging section angularly, a scoop or the like, an operating-cable for said scoop supported by the outer end of said boom, and a windlass for operating said cable, substantially as set forth.

4. In an unloading device, the combination of a wheeled support, a crane thereon having a pivoted mast, and a boom vertically adjustable on said mast and provided with a horizontally-swinging section, means for adjusting said swinging section angularly, a scoop or the like, an operating-cable for said scoop supported by the outer end of said boom, and power-operated mechanism for operating said scoop-cable and moving said boom vertically on said mast, substantially as set forth.

5. In an unloading device, the combination of a support, a pivoted mast, a boom adjustable vertically on said mast and having a horizontally-swinging section, a shaft journaled on said boom, means connecting said shaft and swinging section for adjusting the latter angularly, a scoop, and an operating-cable for said scoop supported at the end of said boom, substantially as set forth, 6. In an unloading device, the combination of a support, a mast, a boom adjustable vertically on said mast and having a horizontally-swinging section, means for adjusting the same angularly, a scoop, an operating-cable for said scoop supported at the end of said boom, and guide-sheaves for said cable on said boom and said support, substantially as set forth.

7. In an unloading device, the combination of a wheeled support, a crane mounted stationarily on said support and provided with a boom adjustable vertically and horizontally, a scoop, an operating-cable therefor supported by the outer end of said boom, a traveling crane on said support having a boom adjustable vertically and horizontally, a second scoop, an operating-cable therefor supported at the outer end of said boom, and power-driven mechanism for operating said scoop-cables, and moving said traveling crane on said support, substantially as set forth.

Witness our hands this 25th day of March, 1904.

JOHN P. SHEEHAN.
CHARLES O. JOHNSON.

Witnesses:
EDWARD C. HARD,
C. M. BENTLEY.